United States Patent
Lipo (10) Patent No.: US 8,648,562 B2
(45) Date of Patent: Feb. 11, 2014

(54) SINGLE POWER SUPPLY DUAL CONVERTER OPEN-WINDING MACHINE DRIVE

(76) Inventor: Thomas A. Lipo, Middleton, WI (US)

( * ) Notice: Subject to any disclaimer, the term of this patent is extended or adjusted under 35 U.S.C. 154(b) by 707 days.

(21) Appl. No.: 12/852,786

(22) Filed: Aug. 9, 2010

(65) Prior Publication Data

US 2012/0032622 A1 Feb. 9, 2012

(51) Int. Cl.
*H02P 27/00* (2006.01)

(52) U.S. Cl.
USPC .............. 318/814; 318/400.01; 318/400.26; 318/400.27; 318/700; 318/727; 318/767; 318/812

(58) Field of Classification Search
USPC .......... 318/400.01, 400.26, 400.27, 700, 727, 318/767, 812, 814
See application file for complete search history.

(56) References Cited

U.S. PATENT DOCUMENTS

| | | | |
|---|---|---|---|
| 2,691,756 A | 10/1954 | Schaelchlin et al. | |
| 3,792,286 A | 2/1974 | Meier | |
| 3,858,105 A * | 12/1974 | Gyugyi | 363/160 |
| 4,672,291 A | 6/1987 | Rosenberg | |
| 4,760,321 A | 7/1988 | Tanaka et al. | |
| 4,843,296 A | 6/1989 | Tanaka | |
| 4,896,063 A * | 1/1990 | Roberts | 310/68 R |
| 5,304,882 A | 4/1994 | Lipo et al. | |
| 5,412,557 A * | 5/1995 | Lauw | 363/37 |
| 5,642,021 A * | 6/1997 | Liang et al. | 318/146 |
| 5,912,542 A | 6/1999 | Zalesski | |
| 5,965,995 A | 10/1999 | Seibel et al. | |
| 6,104,159 A | 8/2000 | Seok | |
| 6,476,315 B2 * | 11/2002 | Ganz | 136/244 |
| 7,299,708 B2 * | 11/2007 | Ho | 73/862.193 |
| 2008/0013590 A1 * | 1/2008 | Sedighy et al. | 373/102 |
| 2008/0116759 A1 | 5/2008 | Lin | |
| 2009/0033254 A1 * | 2/2009 | Nagashima et al. | 318/139 |
| 2009/0174188 A1 * | 7/2009 | Huang et al. | 290/46 |
| 2011/0031930 A1 * | 2/2011 | Kajouke | 320/128 |

OTHER PUBLICATIONS

Muljadi, E. et al., "Adjustable AC Capacitor for a Single Phase Induction Motor," Wisconsin Electric Machines and Power Electronics Consortium, Research Report 91-98, Oct. 1991, pp. 185-190.

Muljadi, E., et al., "Power Factor Enhancement of Induction Machines by Means of Solid-State Excitation," IEEE Transactions of Power Electronics, vol. 4, No. 4, Oct. 1989, pp. 409-418.

Welchko, B. A., "Magnet Flux Nulling Control of Interior PM Machine Drives for Improved Response to Short-Circuit Faults," 39th IAS Annual Meeting, Conference Record of the 2004 IEEE Industry Applications Conference, vol. 1, Oct. 2004, pp. 261-267.

Welchko, B. A., "The Influence of Topology Selection on the Design of EV/HEV Propulsion Systems," IEEE Power Electronics Letters, vol. 1, No. 2, Jun. 2003, pp. 36-40.

Welchko, B. A., "A Comparative Evaluation of Motor Drive Topologies for Low-Voltage, High-Power EV/HEV Propulsion Systems," 2003 IEEE International Symposium on Industrial Electronics, vol. 1, Jun. 2003, pp. 379-384.

* cited by examiner

*Primary Examiner* — Kawing Chan
(74) *Attorney, Agent, or Firm* — Foley & Lardner LLP (57) ABSTRACT

An apparatus for improving machine drive performance. The apparatus includes a controller configured to control an impedance of a converter. The converter is configured to be electrically coupled to a plurality of first ends of a plurality of windings of a machine. A plurality of second ends of the plurality of windings of the machine are configured to be electrically coupled to a power source.

21 Claims, 8 Drawing Sheets

SINGLE POWER SUPPLY DUAL CONVERTER OPEN-WINDING MACHINE DRIVE

BACKGROUND

The present disclosure relates generally to the field of machine drives. More particularly, the present disclosure relates to optimizing machine drive parameters.

Machine drives (i.e., motors) can be controlled using various circuit topologies. In settings where speed control is needed, induction motors are typically driven by an inverter powered by a direct current (DC) voltage supply. The speed of the machine can be controlled by controlling the frequency of the inverter. Similarly, brushless DC machines and permanent magnet (PM) machines require control of the current through the windings in order to control speed, again accomplished by means of an inverter.

However, alternating current (AC) machine drive efficiency suffers from parasitic reactive components that occur because of the dynamic mismatching of the drive circuit to the machine drive. Machine drives can also suffer from requirements such as field weakening. Various circuits and control strategies have been developed in order to address these issues. However, prior approaches to increasing machine drive efficiency are complex and costly. Therefore, improved circuits and methods to improve machine drive efficiency and operation characteristics are needed.

SUMMARY

An illustrative embodiment relates to an apparatus for improving machine drive performance. The apparatus includes a controller configured to control an impedance of a converter. The converter is configured to be electrically coupled to a plurality of first ends of a plurality of windings of a machine. A plurality of second ends of the plurality of windings of the machine are configured to be electrically coupled to a power source.

Another illustrative embodiment relates to a method for improving machine drive performance. The method includes powering a machine at a first plurality of ends of a plurality of windings of the machine. A second plurality of ends of the plurality of windings of the machine are electrically coupled to a variable impedance load. An impedance of the variable impedance load can be controlled.

Another illustrative embodiment relates to an article of manufacture including a computer-readable medium having computer readable instructions stored thereon that, if executed by a computing device, cause the computing device to perform operations including controlling an impedance of a converter. The converter is configured to be electrically coupled to a plurality of first ends of a plurality of windings of a machine. A plurality of second ends of the plurality of windings of the machine are configured to be electrically coupled to a power source.

DETAILED DESCRIPTION

Described herein are illustrative systems, methods, computer-readable media, etc. for single power supply, dual converter, open-winding machine drives. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Figure 1:
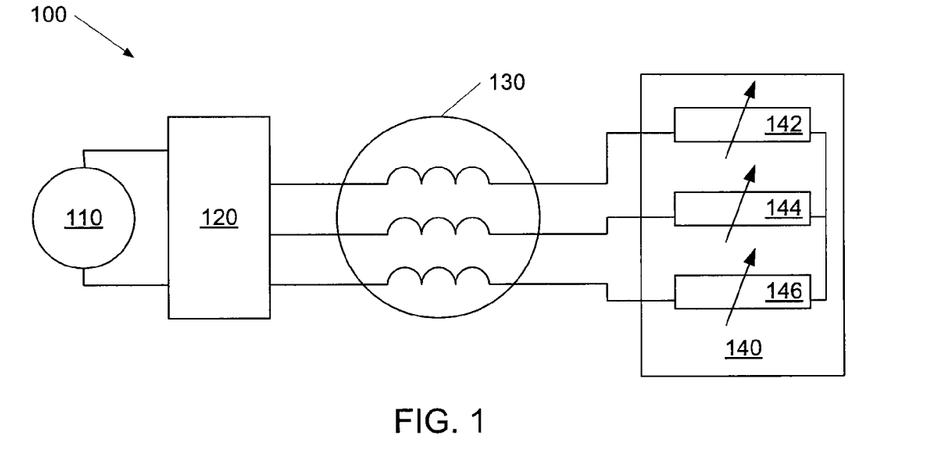
FIG. 1 is a schematic of a single power supply dual converter open-winding machine drive in accordance with an illustrative embodiment.

Referring to FIG. 1, a schematic of a single power supply dual converter open-winding machine drive 100 in accordance with an illustrative embodiment is shown. The single power supply dual converter open-winding machine drive 100 includes a direct current power supply 110, a first converter 120, a machine 130, and a second converter 140. The machine 130 can be any AC motor such as a permanent magnet motor or an induction motor. The machine 130 can include armature windings. For example, when the machine 130 is a three-phase permanent magnet motor the stator can include three armature windings. The machine 130 can have open windings. In a typical motor, the windings are tied together at a respective point in the motor. In an open-winding machine the windings are not tied together. For example, a three-phase permanent magnet motor with three open windings can have six terminals. For the purpose of clarity and consistency, one end of each of the open windings of a machine shall be referred to as the input side of the machine (a powered side) and the other ends shall be referred to as the output side of the machine (a neutral side). Thus, in a typical application, the output of the machine would be tied together to form a neutral. Alternatively, the machine 130 can be a generator.

The direct current power supply 110 can be any voltage and supply any amount of current. The direct current power supply 110, can be, for example, a battery such as a battery in a hybrid vehicle, a rectified alternating current (AC) source, or any other power source that provides a direct current output. The direct current power supply 110 can be electrically connected to an input of the first converter 120.

The first converter 120 can be an inverter that converts a DC input voltage to an AC output voltage. The first converter 120 can include solid state components. be In one embodiment, the first converter 120 takes a DC input and converts it to a two phase AC output. In another embodiment, the first converter 120 takes a DC input and converts it to a three phase AC output. In another embodiment, the first converter 120 takes a DC input and converts it to a n-phase AC output. In one embodiment, the AC output of the first converter 120 can be a sinusoid where the phase is evenly distributed amongst the outputs of the first converter 120. In another embodiment, the AC output of the first converter 120 can be a sinusoid approximation where with various phase offsets at the outputs of the first converter 120. Various inverter topologies, such as pulse width modulation, can be used as is well known in the art. The first converter 120 can be electrically connected to an input of the machine 130.

As discussed above, the machine 130 can be, for example, a permanent magnet motor or any other kind of motor. An output of the machine 130 can be electrically connected to the second converter 140.

The second converter 140 can be controlled to form a variable impedance circuit. The second converter 140 can include solid state components. The second converter 140 can be any circuit that appears as individual variable impedance loads (142, 144, 146) for each of the windings of the machine 130 where the individual variable impedance loads (142, 144, 146) are tied together on one side and electrically connected to a winding of the machine 130 on the other side. In one embodiment, the second converter 140 can be a second inverter. In another embodiment, the second converter 140 can be a second inverter with a capacitor connected across the DC side of the second inverter. The second converter 140 can be configured to change its impedance such that first converter 120 operates at a unity power factor, to change its impedance such that first converter 120 operates at a predetermined power factor, to provide an extended flux weakening region, or to operate such that any other machine drive parameter, such as power factor, is optimized or controlled. The second converter 140 can include a controller (not shown) to manipulate the individual variable impedance loads (142, 144, 146). The second converter 140 can be integrated into a housing of the machine 130, or the second converter 140 can be located in an electronics cabinet, etc. Advantageously, the machine drive can be operated more efficiently at a unity power factor. Advantageously, the machine drive can produce higher speeds with an extended flux weakening region.

Figure 2:
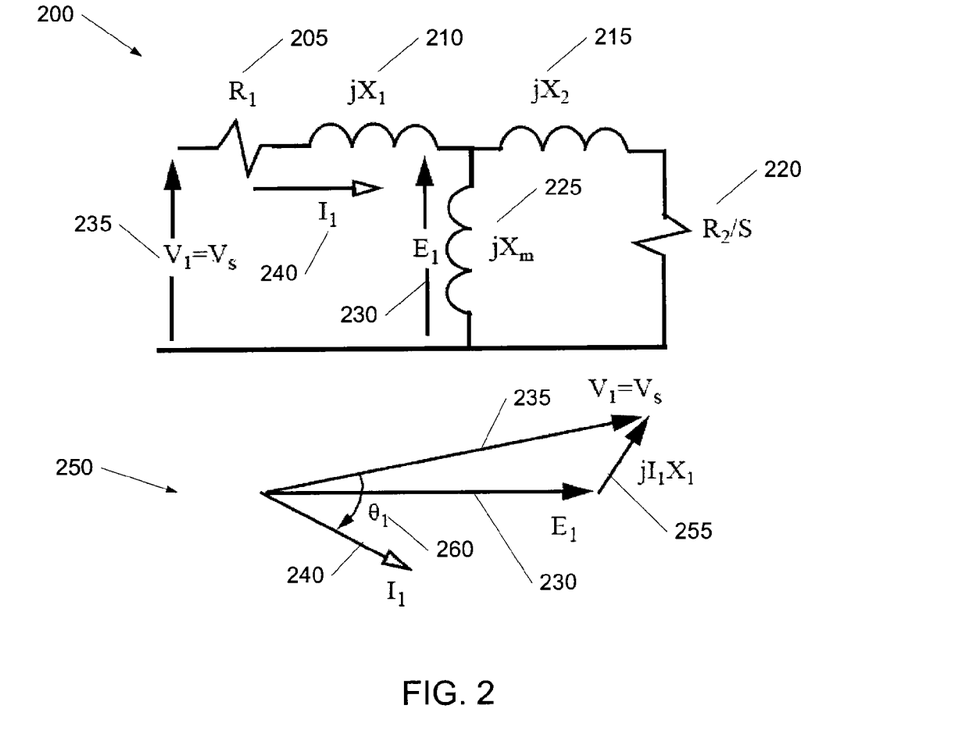
FIG. 2 is a schematic of an induction machine equivalent circuit and a phasor diagram for the induction machine equivalent circuit in accordance with an illustrative embodiment.

Referring to FIG. 2, a schematic of an induction motor equivalent circuit 200 and a phasor diagram 250 for the induction motor equivalent circuit 200 in accordance with an illustrative embodiment is shown. In particular, the induction motor equivalent circuit 200 is for a squirrel cage induction machine. The induction motor equivalent circuit 200 represents, in part, a stator winding and a rotor winding (i.e., the squirrel cage). The induction motor equivalent circuit 200 includes a stator resistance (R1) 205, a stator leakage reactance (jX1) 210, a rotor leakage reactance (jX2) 215, a equivalent rotor resistance (R2/S) 220 where S is slip, coupling reactance (jXm) 225, and an air gap voltage (E1) 230. V1=Vs is a stator voltage 235 across the stator winding. I1 is a stator current 240 through the stator winding.

The phasor diagram 250 for induction motor equivalent circuit 200 includes the stator voltage 235, the air gap voltage (E1) 230, current through the stator winding 240. The difference between the stator voltage 235 and the air gap voltage (E1) 230 is vector jI1X1 255. The stator resistive voltage drop I1R1 is neglected in the phasor diagram 250 since it is very small and does not affect the basic principle. In general, the stator current 240 lags the stator voltage 235 (i.e., the source voltage) by a power factor angle ($\theta 1$) 260. The efficiency of the motor is determined in large part by the power factor angle 260.

Figure 3:
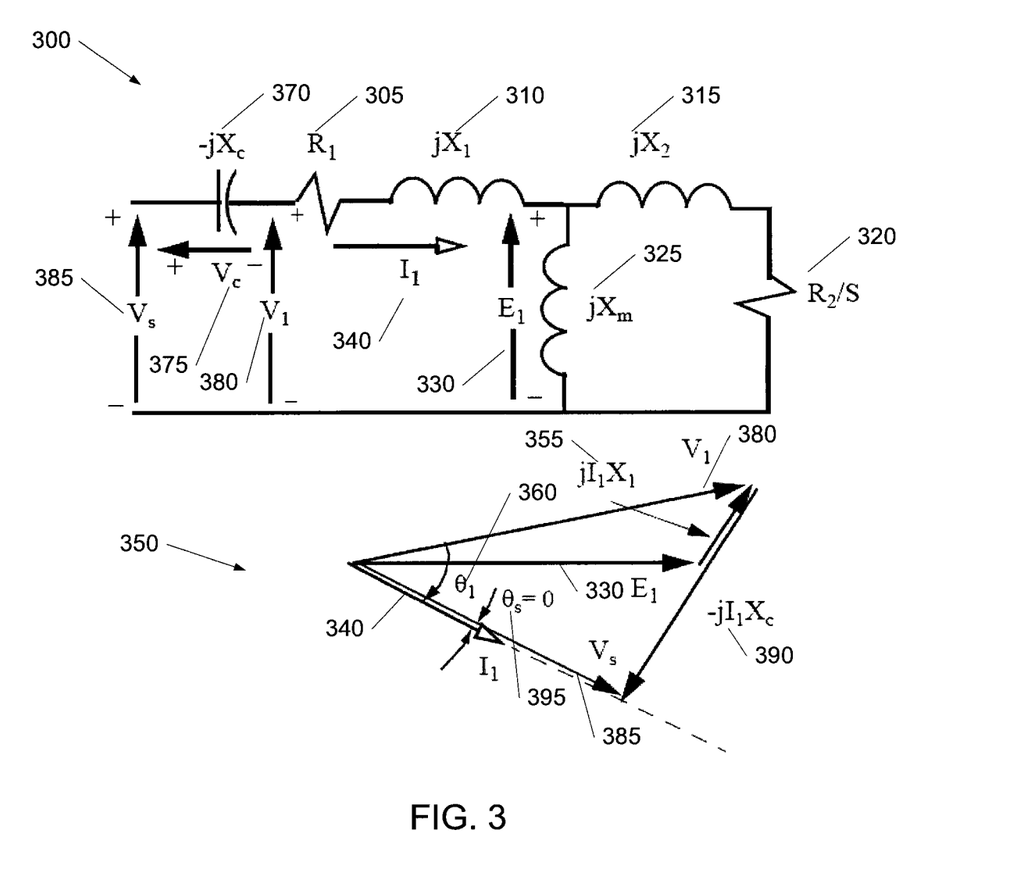
FIG. 3 is a schematic of an induction machine equivalent circuit with series compensation and a phasor diagram for the induction machine equivalent circuit with series compensation in accordance with an illustrative embodiment.

Referring to FIG. 3, a schematic of an induction motor equivalent circuit with series compensation 300 and a phasor diagram 350 for the induction motor equivalent circuit with series compensation 300 in accordance with an illustrative embodiment is shown. The induction motor equivalent circuit with series compensation 300 represents, in part, a stator winding and a rotor winding. In particular, the induction motor equivalent circuit with series compensation 300 is for a squirrel cage induction machine with a converter coupled to the end of the stator windings that would normally be tied directly together, as described above. The induction motor equivalent circuit with series compensation 300 includes a stator resistance (R1) 305, a stator leakage reactance (jX1) 310, a rotor leakage reactance (jX2) 315, an equivalent rotor resistance (R2/S) 320 where S is slip, coupling reactance (jXm) 325, an air gap voltage (E1) 330, and a converter equivalent reactance (-jXc) 370. V1 is a stator voltage 380 across the stator winding. Vs is a supply voltage 385 across the input of the circuit. Vc is a converter voltage 375 across the converter equivalent reactance (-jXc) 370. I1 is a stator current 340 through the stator winding.

The phasor diagram 350 for induction motor equivalent circuit 300 includes stator voltage 380, the air gap voltage (E1) 330, current through the stator winding 340, and the supply voltage 385. The difference between stator voltage 380 and the air gap voltage (E1) 330 is vector jI1X1 355. The difference between stator voltage 380 and the supply voltage 385 is vector -jI1Xc 390. In general, the stator current 340 lags the stator voltage 380 by a power factor angle ($\theta 1$) 360. However, lag between the stator current 340 and the supply voltage 385 has a power factor angle ($\theta s$) 395 of zero or approximately zero. Thus, the induction motor equivalent circuit with series compensation 300 can operate at a unity power factor, thus, increasing efficiency.

The converter is assumed to be controlled to produce exactly the equivalent value of capacitance (i.e., converter equivalent reactance (-jXc) 370) to bring the current into alignment with the source voltage. The stator voltage V1 and current I1 of the induction motor are unchanged so that the motor torque, speed and rotor current are unchanged. However, relative to FIG. 2, now the stator current is in-phase with the source voltage, making it appear that the motor is running at unity power factor as viewed from the motor terminals. In addition, the scalar amplitude of the supply voltage 385 is less than the scalar amplitude of the stator voltage 380. This occurs because some of the vector -jI1Xc 390 is used to cancel the vector jI1X1 355.

Many practical applications use a variable frequency power converter (inverter) for the source voltage. In these applications, the maximum speed that can be reached is dependent on the maximum AC voltage that can be produced by the inverter connected to the motor terminals. Advantageously, an induction motor with series compensation can reduce the required source voltage by, for example, 20%. Therefore, the speed of the motor can be increased by 20% before the inverter can no longer increase the voltage. Power is the product of torque and speed. Advantageously, if the torque is held constant (as is the case in FIGS. 2 and 3), and the speed would be increased by 20%, then the power output would be increased by 20%, thereby saving power and equipment costs since a smaller series compensated motor can be used to accomplish the same task as a traditionally operated motor. This advantage is equally valid for operation from a fixed utility voltage. Since the voltage across the motor V1 380 is greater than the supply voltage Vs 385, a motor of voltage rating greater than the supply voltage and with can be utilized thereby allowing use of a motor with an increased power rating of $1.2*V1*I1*\cos\theta$ rather than $V1*I1*\cos\theta$.

Figure 4:
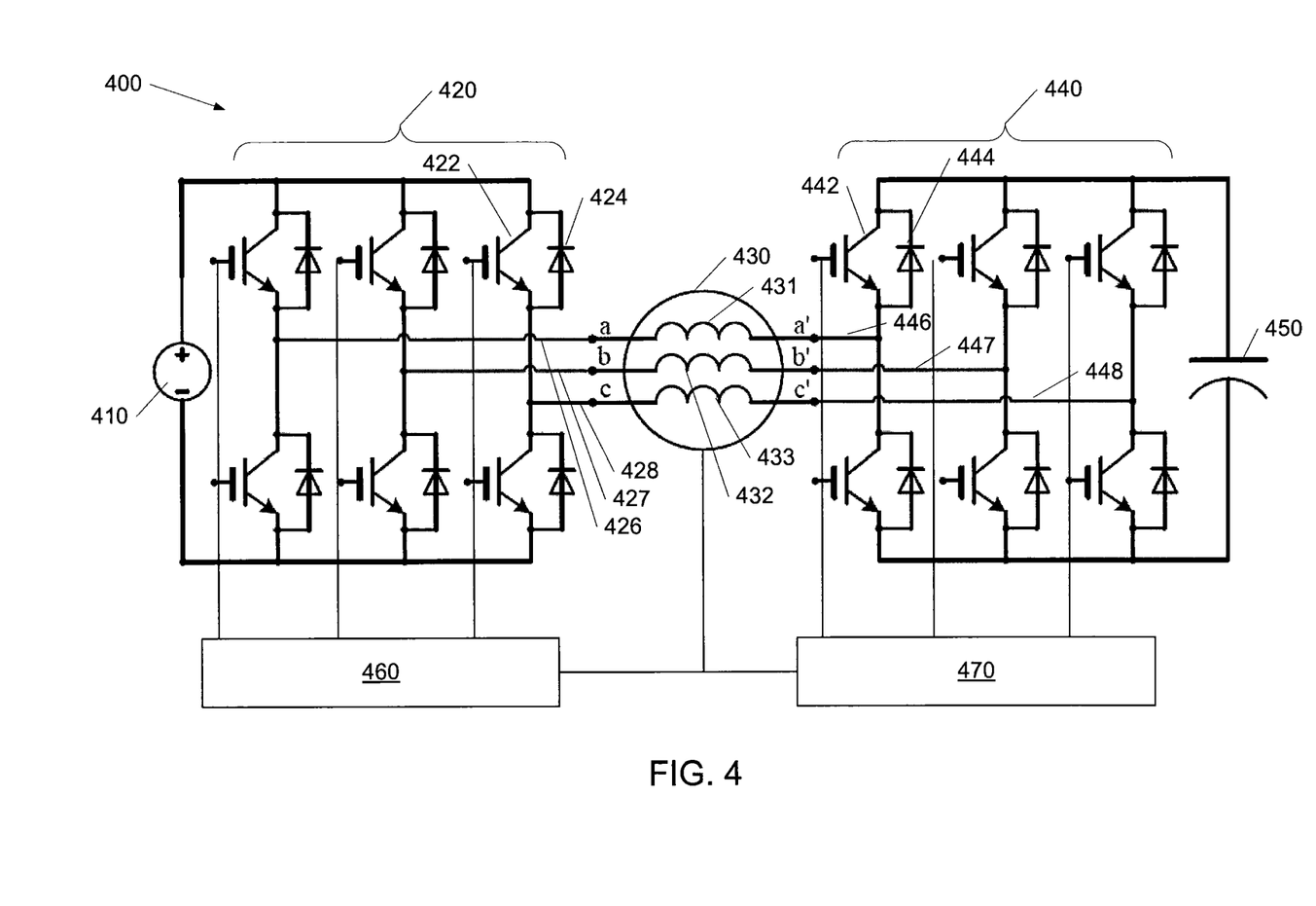
FIG. 4 is a circuit schematic of a single power supply dual inverter open-winding machine drive in accordance with an illustrative embodiment.

Referring to FIG. 4, a circuit schematic of a single power supply dual inverter open-winding machine drive 400 in accordance with an illustrative embodiment is shown. The single power supply dual inverter open-winding machine drive 400 includes a direct current power supply 410, a first inverter 420, a machine 430, a second inverter 440, and a capacitor 450. The machine 430 can be an AC motor such as a permanent magnet motor, a synchronous motor, or an induction motor. The machine 430 can include open windings 431-433. The open windings 431-433 have an input side (a, b, c) and an output side (a', b', c'). Alternatively, the machine 430 can be a generator.

The direct current power supply 410 can be any voltage and supply any amount of current, as described above. The direct current power supply 410, can be, for example, a battery such as a battery in a hybrid vehicle, a fuel cell, a rectified AC source, or any other power source that provides a DC output. The direct current power supply 410 can be electrically connected to an input of the first inverter 420.

The first inverter 420 converts a DC input to an AC output. In one embodiment, the first inverter 420 takes the DC input of the direct current power supply 410 and converts it to a three phase AC output on legs 426-428. For example, the three phase AC output can be 120 V @ 60 Hz where the waveforms on the legs 426-428 are 120 degrees out of phase relative to each other. The first inverter 420 includes transistors 422 and bypass diodes 424. Alternatively, other well-known inverter topologies can be used such as BJTs, MOSFETs, pulse width modulation, etc. Alternatively, the number of legs (i.e. phases) can vary.

The first inverter 420 can include a first controller 460. The first controller 460 can control the frequency of the output of the first inverter 420 by varying the switching of transistors 422. A DC supply and inverter combination can be used to control the speed of an AC motor. If an AC motor is connected directly to the line voltages, the AC motor will run at frequency of the line voltage (e.g. 60 Hz from the utility). Thus, an inverter allows for control of the drive speed by changing the frequency of the inverter output/motor input. The legs 426-428 of the first inverter 420 can be electrically connected to the input side (a, b, c) of the open windings 431-433 of the machine 430, respectively.

As discussed above, the machine 430 can be, for example, a permanent magnet motor, a wound rotor induction motor, an induction motor with a squirrel cage, or any other kind of motor or drive. The output side (a', b', c') of the open windings 431-433 of the machine can be electrically connected to legs 446-448 of the second inverter 440.

The second inverter 440 can be a variable impedance circuit. The second inverter 440 includes transistors 442 and bypass diodes 444. Alternatively, other well-known inverter topologies can be used. Alternatively, the number of legs (i.e. phases) can vary.

The second inverter 440 can include a second controller 470. The second controller 470 can control the effective impedance of the input of the second inverter 440 by varying the switching of transistors 442. The first controller 460 and the second controller 470 can be communicatively coupled. The capacitor 450 can be electrically connected to the DC-side of the second inverter 440.

The second controller 470 can be configured to change the input impedance of the second inverter 440 such that the single power supply dual inverter open-winding machine drive 400 operates at a unity power factor. Alternatively, second controller 470 can be configured to change the input impedance of the second inverter 440 such that a flux weakening region of the machine 430 is extended by making the input impedance of the machine 430 inductive. Likewise, other machine drive parameters can be optimized or controlled. Advantageously, the machine drive can be operated more efficiently at the unity power factor. Advantageously, the machine drive can produce more horsepower at higher speeds with an extended flux weakening region.

The second inverter 440 can be controlled to appear as the equivalent of a three-phase variable impedance. Since the second inverter 440 is connected in series with the machine 430, the first inverter 420 will see an equivalent variable impedance machine. Assuming the capacitor 450, which is floating, is sufficiently large and the voltage is constant, the second inverter 440 can be modeled as a controlled voltage source producing the effect of an equivalent variable impedance. The equivalent impedance of the second inverter 440 can be calculated as the ratio of the output voltage of second inverter 440 divided by the machine current. When output voltage of the second inverter 440 is leading the machine current by 90 degrees, the equivalent impedance of the converter is purely inductive. When output voltage of the second inverter 440 is lagging the machine current by 90 degrees, the equivalent impedance of the converter is purely capacitive.

The value of the equivalent impedance can be changed by varying the voltage amplitude of the second inverter 440. Unlike physical capacitors or inductors, the equivalent impedance in series with the machine 430 in its d-axis and q-axis representation can be controlled independently. For example, the second inverter 440 can be controlled so as to appear capacitive in the q-axis (torque producing axis) and inductive in the d-axis (flux producing axis).

Ideally, if there is no real power flowing into or out of the capacitor 450, the voltage of capacitor 450 will be constant. In practice, however, a small amount of real power will flow into the second inverter 440 to compensate for losses. If a small portion of the voltage (AC side) of the second inverter 440 is in phase with the current of the machine 430, real power will flow into the second inverter 440 and the capacitor 450. As a result, the voltage of capacitor 450 will be pumped up. In contrast, the voltage of the capacitor 450 will drop if the output voltage component is 180 degrees out of phase with the current of the machine 430. Therefore, the voltage of the capacitor 450 can be regulated by controlling the amplitude of voltage of the capacitor 450 that is in phase with the current of the machine 430.

With the equivalent variable impedance, the terminal characteristics of the machine 430 and the second inverter 440 viewed from the first inverter 420 can be shaped according to different applications.

Alternatively, when the machine 430 is a generator, the direct current power supply 410 and the first inverter 420 are replaced with a load, such as an AC load or a rectifier and battery. The second inverter 440 can be controlled to match the input impedance of the load so that all or a portion of the reactive component of the load is supplied by the second inverter 440.

Unity Power Factor Operation

The voltage of the direct current power supply 410 can be better utilized when the first inverter 420 operates at a unity power factor. More current can then be pushed through the machine 430 using the same DC bus voltage resulting in better utilization of the kVA rating of the first inverter 420. Operation at any selected power factor including a unity air gap power factor is possible using the proposed topology. Referring again to FIG. 3, the phase of the current I1 340 is set to zero with respect to E1 330 in this case. If the equivalent impedance of the second inverter 440 is controlled to be in phase with the terminal voltage Vs 385, the machine will operate at unity terminal power factor (i.e., a power factor of 1) as a motor. If the equivalent impedance of the second inverter 440 is controlled to be in anti-phase (180 degree phase) with respect to the terminal voltage Vs 385 the machine will operate at unity power factor as a generator.

Figure 5:
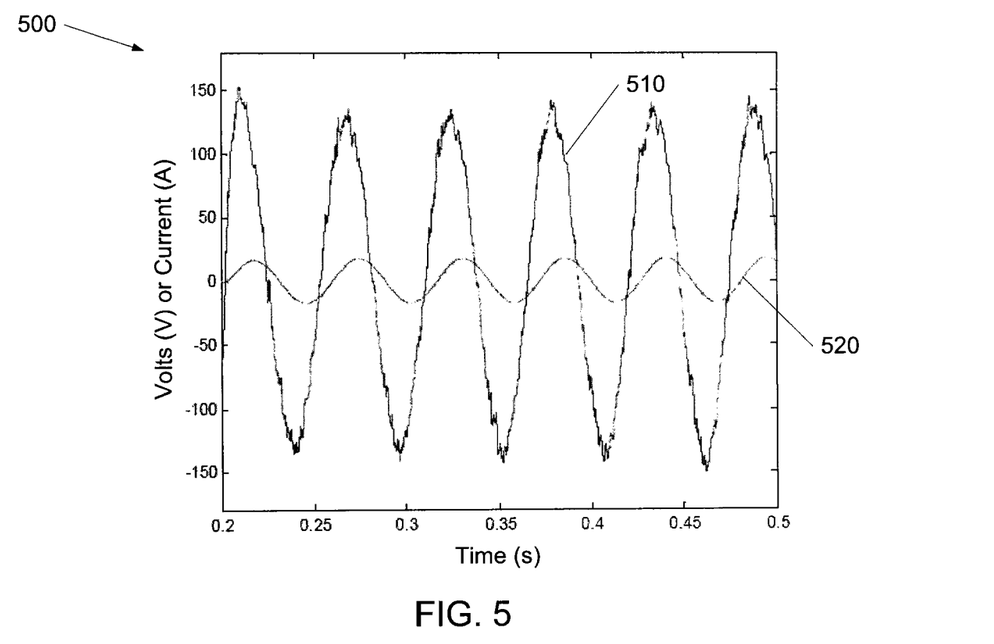
FIG. 5 is a graph of a simulation of an induction machine in accordance with an illustrative embodiment.

Referring to FIG. 5, a graph of a simulation of an induction motor 500 in accordance with an illustrative embodiment is shown. The graph of the simulation of the induction motor 500 shows voltage (V) or current (I) versus time (s) for a first inverter connected to a motor without a second converter (i.e. the first inverter is configured as a typical synchronous frame current regulator). Plot 510 is a voltage of a leg of the first inverter. Plot 520 is a current of a leg of the first inverter. Plot 510 and plot 520 are out of phase resulting in a power factor less than one.

Figure 6:
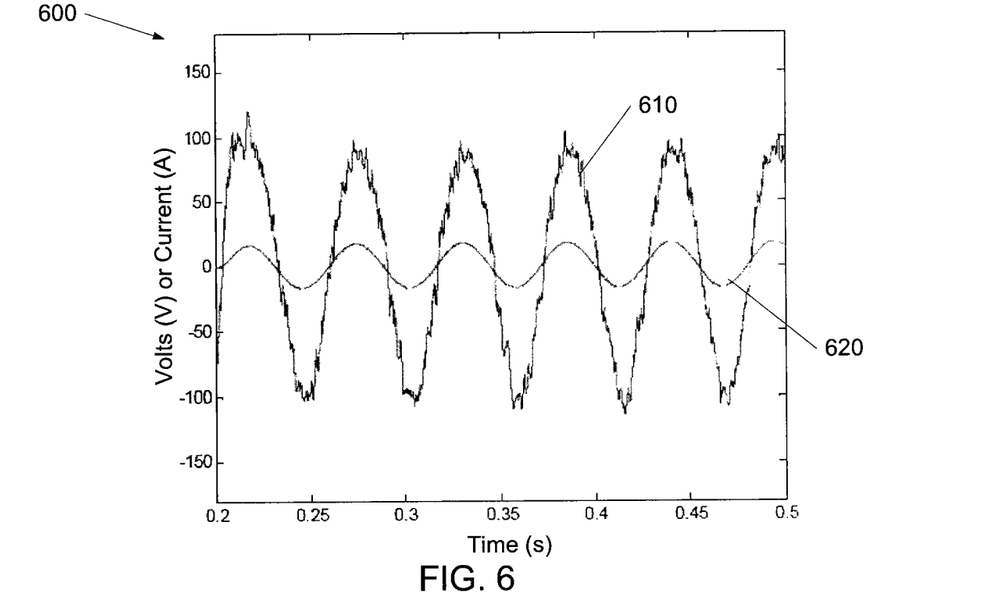
FIG. 6 is a graph of a simulation of an induction machine with a converter in accordance with an illustrative embodiment.

Referring to FIG. 6, a graph of a simulation of an induction motor with a second converter 600 in accordance with an illustrative embodiment is shown. The graph of the simulation of the induction motor with the second converter 600 shows voltage (V) or current (I) versus time (s) for a first inverter connected to a motor with a second converter, for example, a second inverter (i.e., as in FIG. 4). Plot 610 is a voltage of a leg of the first inverter. Plot 620 is a current of a leg of the first inverter. Plot 610 and plot 620 are in phase. Therefore, the induction motor with the converter is operating at about unity power factor.

For the same current, the amplitude of the first inverter voltage is smaller when the first inverter voltage is operating at unity power factor reducing the required kVA rating of the first inverter voltage. Additionally, the use of the open winding connection produces a very smooth sine wave current due to the inherent filtering action of the series connected permanent magnet stator inductance.

Extended Flux Weakening Region

The ability to control the effective impedance as seen from the AC terminals of a first inverter is useful in a permanent magnet motor drive which typically requires a constant horsepower operating range. The constant horsepower range occurs at high rotational speed beyond the point in which the internal voltage generated by the rotating permanent magnet reaches the maximum capable AC voltage of the first inverter. The speed at this point is called the critical speed. Above the critical speed the first inverter imposes limits on both voltage and current (and thus power) that can be delivered to the machine. Below the critical speed, a converter or second inverter can be controlled to act as a capacitor, as discussed as above, thereby improving the terminal power factor for any value of desired torque. However, above the critical speed the available power drops rapidly unless action is taken to extend the speed range and continue to operate with constant power.

The ability of a permanent magnet machine to operate in the constant horsepower mode is typically determined by the machine's characteristic current defined as Icc=E/Xds where E is the internal emf phase voltage of the permanent magnet machine and Xds is the direct axis reactance of the machine. When the characteristic current of the machine drive is larger than the rated current, there is a finite maximum speed for which the machine can operate. Above this maximum speed, the machine rapidly becomes unable to deliver any average torque. This case typically occurs when the machine is designed to better utilize its permanent magnets such as when magnets are located on the rotor surface.

On the other hand, if the characteristic current is equal to the rated current, the constant horsepower range can be extended indefinitely. In order to achieve this effect, the direct axis reactance must be relatively large to reduce Icc to be equal to or less than the rated current. This inevitably leads to a large and bulky (effectively oversized) machine drive compared to a well-designed surface magnet machine.

Referring again to FIG. 4, when the machine 430 (here a permanent magnet motor) operates below the critical speed, the second inverter 440 can be programmed to operate as a capacitive reactance and thus improve the power factor. When the machine 430 operates above the critical speed in the constant power range, the second inverter 440 can be programmed so that the sum of the machine direct axis reactance plus the equivalent inductive reactance produced by the second inverter 440 will produce a characteristic current equal to the rated current. That is $X_{INV2}=(E/I_{rated})-X_{ds}$ where $I_{rated}$ is the rated current of the machine drive and $X_{INV2}$ is the value of the inductive reactance produced by controlling the second inverter 440 in the proper manner.

Figure 7:
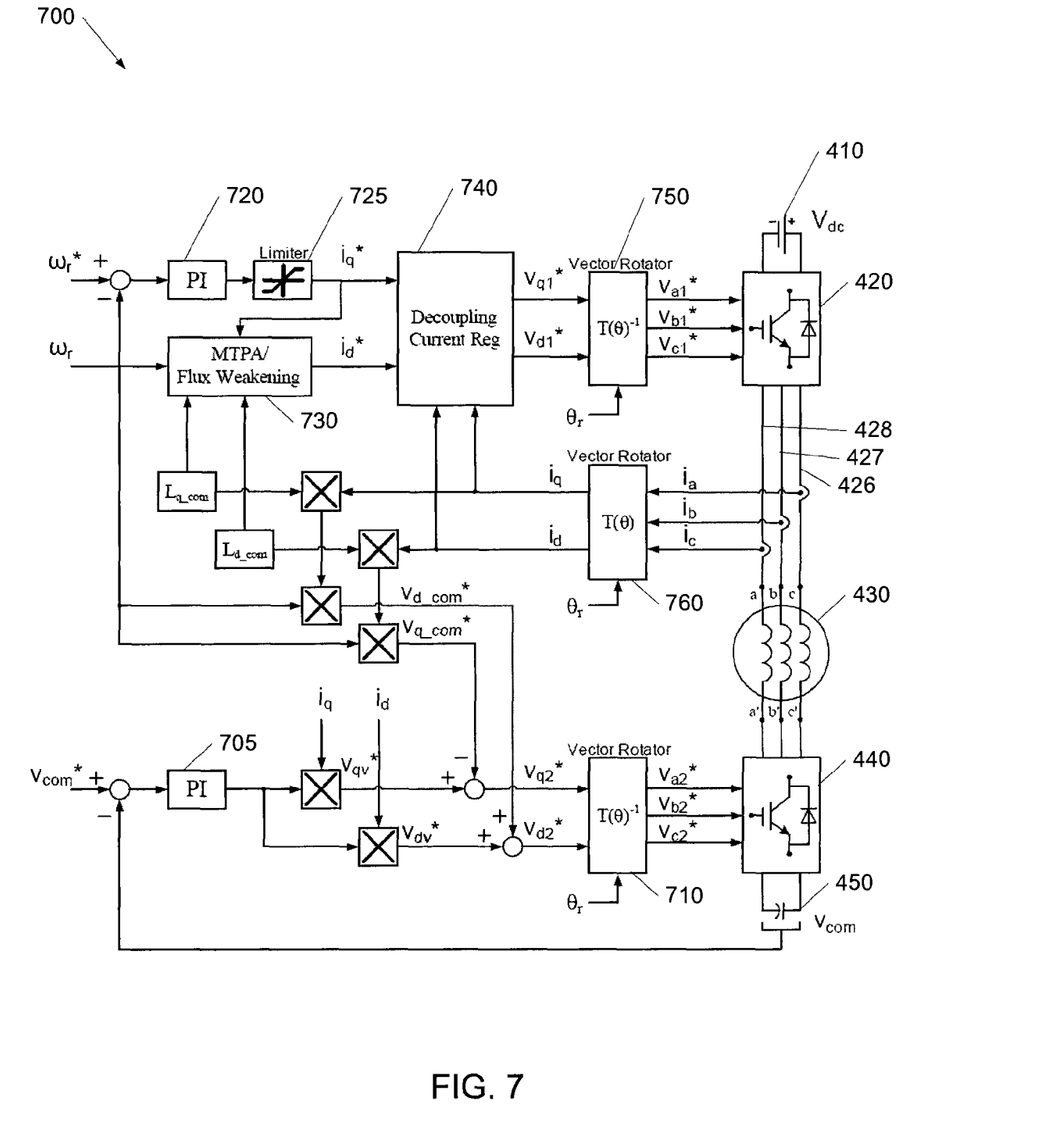
FIG. 7 is a schematic of a controller for a single power supply dual inverter open-winding machine drive of FIG. 4 in accordance with an illustrative embodiment.

Referring to FIG. 7, a schematic of a controller 700 for a single power supply dual inverter open-winding machine drive 400 of FIG. 4 in accordance with an illustrative embodiment is shown. The controller 700 can control first inverter 420 and second inverter 440. The controller 700 can be a circuit, a programmable logic computer, a desktop computer, a laptop computer, or other type of computing device known to those of skill in the art.

The controller 700 can control the output voltage of the second inverter 440 according to phase current (i.e. legs 426-428) and a voltage across capacitor 450. Phase current information can be determined by a vector rotator 760. The voltage component that is 90 degrees out of phase with current is set to emulate different reactance in d and q-axes, $L_{d\_com}$ and $L_{q\_com}$, respectively, where the subscript "com" denotes commanded values. A proportional-integral (PI) controller 705 smoothes the voltage across capacitor 450. An output of the PI controller 705 and phase current information can be fed to a vector rotator 710. Vector rotator 710 controls the transistors of the second inverter 440 thereby altering the perceived impedance of the second inverter 440 and the voltage across capacitor 450.

The controller 700 can control the output voltage of the first inverter 420 according to the phase current (i.e. legs 426-428). A target drive frequency ($\omega_r$) can be fed to a PI controller 720 and a maximum torque per ampere/flux weakening module 730. The output of the PI controller 720 is fed to a frequency limiter 725. The output of the frequency limiter 725 can be fed to the maximum torque per ampere/flux weakening module 730 and a decoupling current regulator 740. The output of the maximum torque per ampere/flux weakening module 730 is also fed to the decoupling current regulator 740. The decoupling current regulator 740 generates a q-axis and d-axis voltage reference that can be used by a vector rotator 750 to control transistors of the first inverter 420.

Under base speed, the required torque can be mapped into a desired $i_d$ and $i_q$ based on machine parameters by a maximum torque per ampere (MTPA) curve stored in the maximum torque per ampere/flux weakening module 730. Above critical speed, $i_d$ and $i_q$ can be calculated based on both machine parameters and the desired impedance of the second inverter 440.

Alternatively, the controller can be implemented as software executed on a computer. The controller can include control software, a processor, a memory, a display, and a user interface. In alternative embodiments, controller may include fewer, additional, and/or different components. The memory, which can be any type of permanent or removable computer memory known to those of skill in the art, can be a computer-readable storage medium. The memory is configured to store the control software and an application configured to run the control software, and/or other information and applications as known to those of skill in the art. The controller can also include a communication module to receive instructions, to control auxiliary devices, and to report data.

The control software is configured to analyze data from the first converter, the machine, and the second converter. The control software, which can be implemented as computer-readable instructions configured to be stored on the memory, can control the equivalent impedance of the second converter. The processor, which can be in electrical communication with each of the components of controller, can be used to run the application and to execute the instructions of the control software. Any type of computer processor(s) known to those of skill in the art may be used. Alternatively, the controller can implement a perturb and observe scheme.

Figure 8:
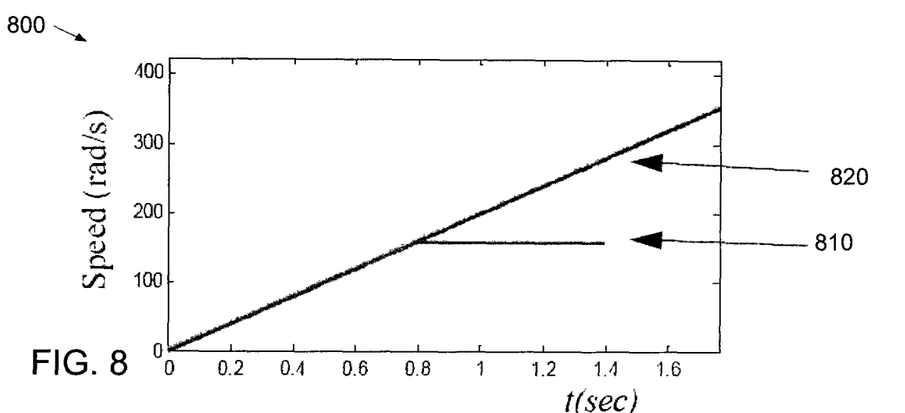
FIG. 8 is a graph of a simulation of a speed ramp comparison of a motor and a motor with a second converter in accordance with an illustrative embodiment.

Referring to FIG. 8, a graph of a simulation of a speed ramp comparison of a motor and a motor with a second converter 800 in accordance with an illustrative embodiment is shown. The graph of a simulation of a speed ramp comparison of a motor and a motor with a second converter 800 shows speed (rad/s) versus time (s) for a motor without and a motor with a second converter, both under no load. Plot 810 is a speed ramp of a motor without a second converter. Plot 820 is a speed ramp of a motor with a second converter. Plot 810 shows that the motor without a second converter is not able to deliver any useful torque beyond about 160 mechanical rad/s. Plot 820 shows that the motor with a second converter, controlled as a d-axis inductor, delivers useful torque beyond 160 mechanical rad/s. In Plot 820, the speed of the motor with a second converter follows the reference to a much higher value.

Figure 9:
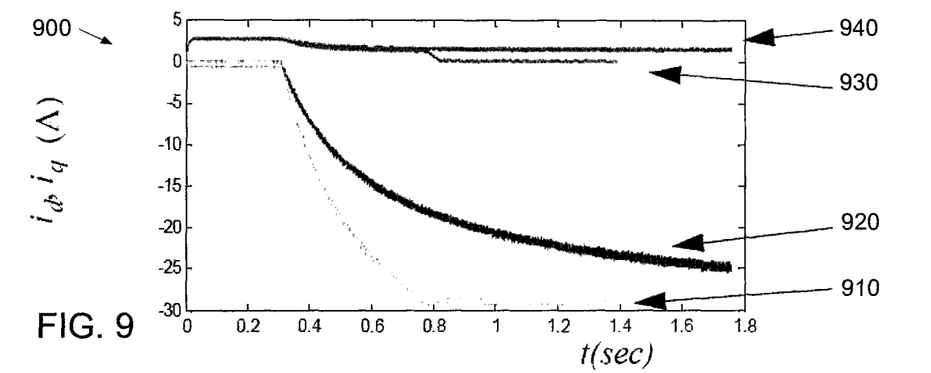
FIG. 9 is a graph of a d-axis current and a q-axis current for the simulation of a speed ramp comparison of a motor and a motor with a second converter of FIG. 8 in accordance with an illustrative embodiment.

Referring to FIG. 9, a graph of a d-axis current and a q-axis current 900 for the simulation of a speed ramp comparison of a motor and a motor with a second converter 800 of FIG. 8 in accordance with an illustrative embodiment is shown. The graph of the d-axis current and the q-axis current 900 shows current (A) versus time (s) for a motor without and a motor with a second converter, both under no load. Plot 910 is a d-axis current of a motor without a second converter. Plot 920 is a d-axis current of a motor with a second converter. Plot 930 is a q-axis current of a motor without a second converter. Plot 940 is a q-axis current of a motor with a second converter. To compensate for the back-emf, the d-axis current increases in negative direction as the speed goes up. Plot 910 shows that with, a smaller effective d-axis inductance, the d-axis current $i_d$ increases faster for a motor without a second converter.

Plot 930 shows that the q-axis current drops faster for a motor without a second converter, since total current is limited by rated value. At around 160 mechanical rad/s in plot 930, the q-axis current drops to zero for a motor without a second converter. Plot 940 shows that, for a motor with a second converter, $i_q$ drops slower and is able to extend the constant power region past 160 mechanical rad/s.

Figure 10:
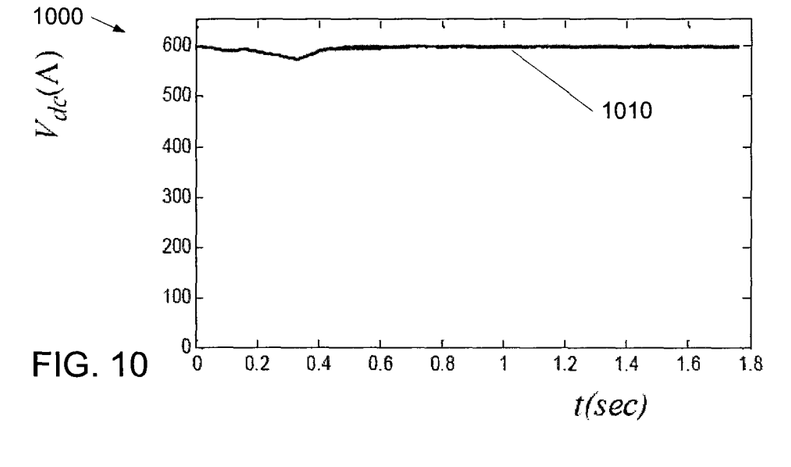
FIG. 10 is a graph of a voltage across a capacitor coupled to a second converter for the simulation of a speed ramp of a motor with a second converter of FIG. 8 in accordance with an illustrative embodiment.

Referring to FIG. 10, a graph of a voltage across a capacitor coupled to a second converter 1000 for the simulation of a speed ramp of a motor with a second converter of FIG. 8 in accordance with an illustrative embodiment is shown. The graph of a voltage across a capacitor coupled to a second converter 1000 shows voltage (V) versus time (s) for a capacitor electrically connected to a second inverter as in FIG. 4. Plot 1010 shows that the voltage is steady and well-regulated during the speed ramp.

Figure 11:
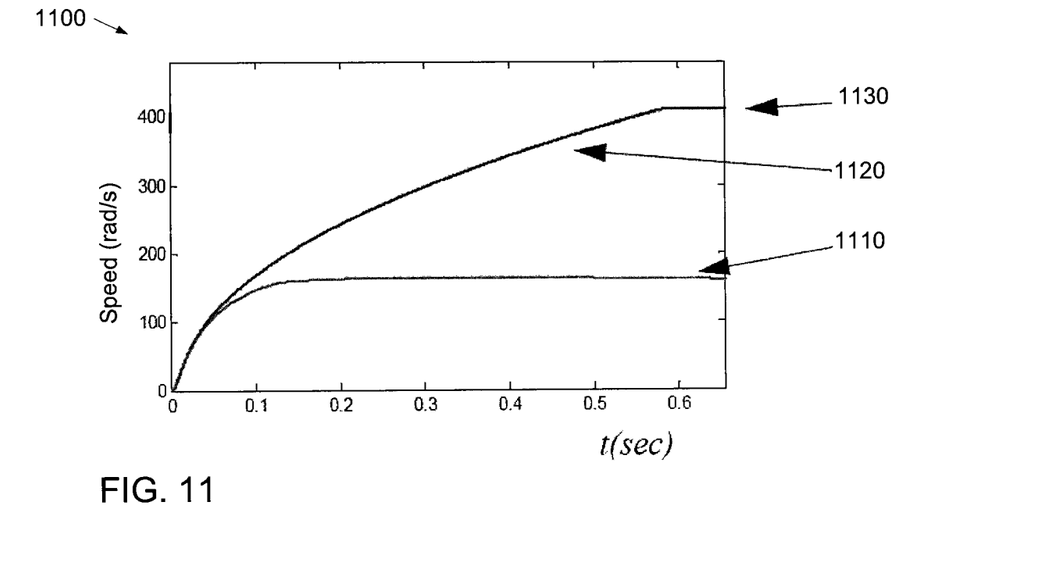
FIG. 11 is a graph of a simulation of a motor and a motor with a second converter receiving a step speed command in accordance with an illustrative embodiment.

Referring to FIG. 11, a graph of a simulation of a motor and a motor with a second converter receiving a step speed command 1100 in accordance with an illustrative embodiment is shown. The graph of a simulation of a motor and a motor with a second converter receiving a step speed command 1100 shows speed (rad/s) versus time (s) for a motor without and a motor with a second converter, both under no load and both receiving a step command 1130 of 400 rad/s. Plot 1110 is a speed ramp of a motor without a second converter. Plot 1120 is a speed ramp of a motor with a second converter. Plot 1110 shows that the motor without a second converter tops out at 160 rad/s because of the effects of high internal voltage due to magnet rotation. Plot 1120 shows that the motor with a second converter is able weaken the field, allowing the motor to attain 400 rad/s.

Figure 12:
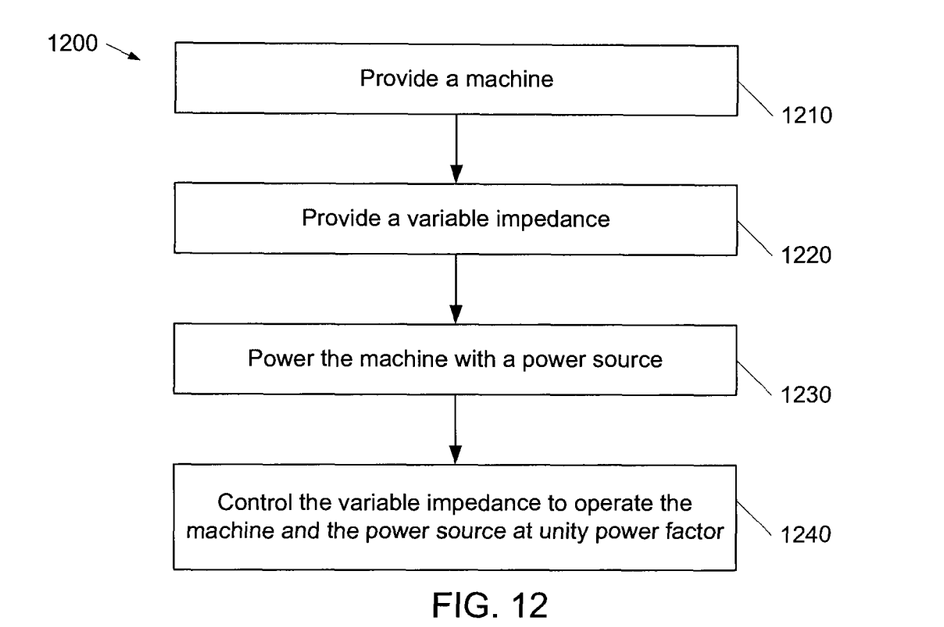
FIG. 12 is a flow diagram illustrating operations performed to operate a machine drive at unity power factor in accordance with an illustrative embodiment.

Referring to FIG. 12, a flow diagram illustrating operations performed to operate a machine drive at unity power factor 1200 in accordance with an illustrative embodiment is shown. In alternative embodiments, fewer, additional, and/or different operations may be performed. In an operation 1210, a machine can be provided. The machine can be a motor such as a permanent magnet motor or an induction motor. The machine can include open windings. The open windings have an input side (i.e., a powered side) and an output side (i.e., a neutral side).

In an operation 1220, a variable impedance load can be provided to the neutral side of the machine. The variable impedance load can be any circuit that appears as individual variable impedance loads across each of the open windings of the machine where the individual variable impedance loads are tied together on one side. In one embodiment, the variable impedance load can be a second converter such as a second inverter. In another embodiment, the variable impedance load can be a second inverter with a capacitor connected across the DC side of the second inverter.

In an operation 1230, the machine can be powered by a power source. For example, an AC source can be provided to the input side of the machine. The AC source can be an inverted DC source or mains power, as described above.

In an operation 1240, the variable impedance load can be controlled so the machine and its power source operate at a unity power factor, as described above. The input impedance of the machine can be controlled such that the reactive component of the power source is cancelled by the reactive components of the machine and variable impedance load. Advantageously, the machine drive can operate more efficiently.

Figure 13:
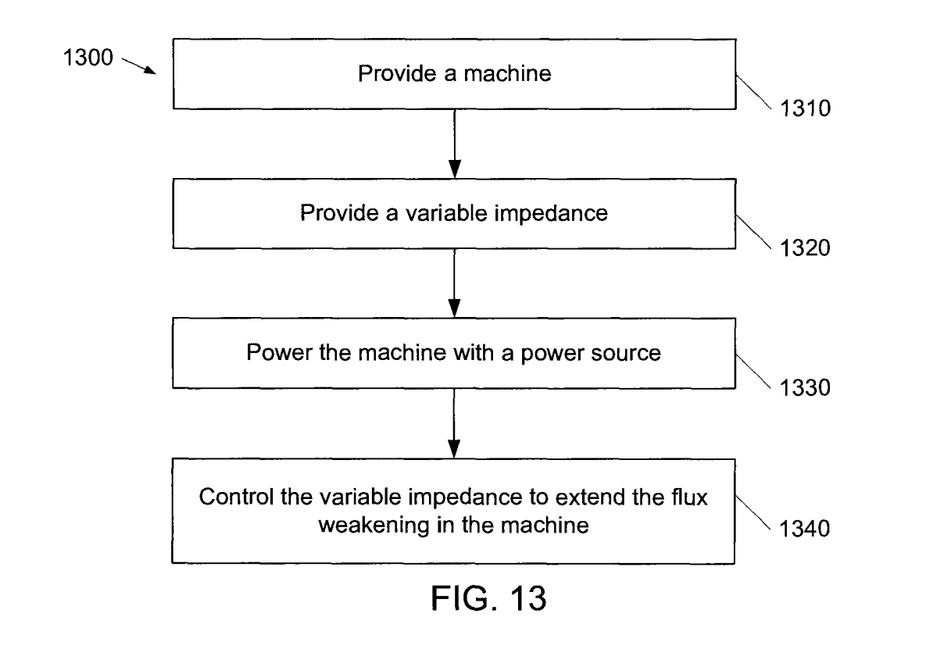
FIG. 13 is a flow diagram illustrating operations performed to operate a machine drive in extended field weakening in accordance with an illustrative embodiment.

Referring to FIG. 13, a flow diagram illustrating operations performed to operate a machine drive in extended field weakening 1300 in accordance with an illustrative embodiment is shown. In alternative embodiments, fewer, additional, and/or different operations may be performed. In an operation 1310, a machine can be provided. The machine can be a motor such as a permanent magnet motor or an induction motor. The machine can include open windings. The open windings have an input side (i.e., a powered side) and an output side (i.e., a neutral side).

In an operation 1320, a variable impedance load can be provided to the neutral side of the machine. The variable impedance load can be any circuit that appears as individual variable impedance loads across each of the open windings of the machine where the individual variable impedance loads are tied together on one side. In one embodiment, the variable impedance load can be a second converter such as a second inverter. In another embodiment, the variable impedance load can be a second inverter with a capacitor connected across the DC side of the second inverter.

In an operation 1330, the machine can be powered by a power source. For example, an AC source can be provided to the input side of the machine. The AC source can be an inverted DC source or mains power, as described above.

In an operation 1340, the variable impedance load can be controlled so the machine and its power source operate to extend flux weakening, as described above. The input impedance of the machine can be controlled such that the reactive component of the machine and variable impedance load appear inductive. For example, the target inductance can be $XINV2=(E/Irated)-Xds$, where XINV2 is the target value of the inductive reactance produced by controlling the second inverter, Irated is the rated current of the machine, E is the internal emf phase voltage of the permanent magnet machine, and Xds is the direct axis reactance of the machine. The inductive component limits the current through the open windings of the machine thereby reducing the flux in the machine. Advantageously, the machine drive can operate at higher speeds with a constant horsepower.

The principles described above can be applied to permanent magnet machines, synchronous reluctance machines, wound field synchronous machines, induction machines, and any other motor. The number of phases need not be limited to three phases. Any number of phases two or greater can be utilized with the proper modification of the associated converter circuit. For example, a five phase machine would have five switch legs rather than three and so forth.

Advantageously, the dual converter topology utilizes only a single power supply. By controlling an auxiliary inverter as a variable impedance, the terminal characteristics seen from the main inverter can be shaped. Unity power factor operation and extended flux weakening region can be achieved by proper control. The floating capacitor voltage can be well regulated by proper control of the second converter. In addition, the dual converter can be used to start a surface magnet permanent magnet machine under a current limited starting condition and then changed to provide additional capacitive reactance to raise the motor power factor to unity when operating from the AC supply.

One or more flow diagrams may have been used herein. The use of flow diagrams is not meant to be limiting with respect to the order of operations performed. The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. An apparatus for improving machine drive performance comprising:
   a controller configured to control an impedance of a converter;
   wherein the converter is configured to be electrically coupled to a plurality of first ends of a plurality of windings of a machine;
   wherein substantially no real power flows through the plurality of first ends;
   wherein a plurality of second ends of the plurality of windings of the machine are configured to be electrically coupled to a power source; and
   wherein a target impedance of the converter is defined by $XINV2=(E/Irated)-Xds$, where $XINV2$ is the target impedance, Irated is a rated current of the machine, E is an internal emf phase voltage of the machine, and Xds is a direct axis reactance of the machine.

2. The apparatus of claim 1, wherein the plurality of windings comprises three windings.

3. The apparatus of claim 2, wherein the converter comprises an inverter.

4. The apparatus of claim 3, further comprising a capacitor electrically coupled to a direct current side of the inverter.

5. The apparatus of claim 1, wherein controlling the impedance of the converter comprises matching the impedance of the converter and the machine to an impedance of the power source.

6. The apparatus of claim 5, wherein matching the impedance of the converter and the machine to the impedance of the power source comprises minimizing the total reactance of the converter, the machine, and the power source.

7. The apparatus of claim 1, wherein the power source comprises a second inverter powered by a direct current power supply.

8. The apparatus of claim 1, wherein the machine comprises at least one of a permanent magnet motor or an induction motor.

9. The apparatus of claim 1, wherein there is no additional power source coupled to the plurality of first ends.

10. A method for improving machine drive performance comprising:
    powering a machine at a first plurality of ends of a plurality of windings of the machine, wherein a second plurality of ends of the plurality of windings of the machine are electrically coupled to a variable impedance load; and
    controlling an impedance of the variable impedance load wherein substantially no real power flows through the plurality of first ends, and wherein a target impedance of the variable impedance load is defined by $XINV2=(E/Irated)-Xds$, where $XINV2$ is the target impedance, Irated is a rated current of the machine, E is an internal emf phase voltage of the machine, and Xds is a direct axis reactance of the machine.

11. The method of claim 10, wherein controlling the impedance of the variable impedance load comprises matching the impedance of the variable impedance load and the machine to an impedance of the power source, wherein a power factor angle associated with a current of a first winding of the plurality of windings and a voltage of the first winding of the plurality of windings is substantially zero.

12. The method of claim 10, wherein controlling the impedance of the variable impedance load comprises altering the impedance of the variable impedance load, wherein the variable impedance load and the machine comprise an inductive reactance, and where the inductive reactance limits a current of the plurality of windings.

13. The method of claim 10, wherein the variable impedance load comprises a converter.

14. The method of claim 13, wherein the converter comprises an inverter.

15. The method of claim 10, wherein the machine comprises at least one of a permanent magnet motor or an induction motor.

16. An article of manufacture including a computer-readable medium having computer readable instructions stored thereon that, if executed by a computing device, cause the computing device to perform operations comprising:
    controlling an impedance of a converter;
    wherein the converter is configured to be electrically coupled to a plurality of first ends of a plurality of windings of a machine;
    wherein substantially no real power flows through the plurality of first ends;
    wherein a plurality of second ends of the plurality of windings of the machine are configured to be electrically coupled to a power source; and
    wherein a target impedance of the converter is defined by $XINV2=(E/Irated)-Xds$, where $XINV2$ is the target impedance, Irated is a rated current of the machine, E is an internal emf phase voltage of the machine, and Xds is a direct axis reactance of the machine.

17. The article of manufacture of claim 16, wherein controlling an impedance of the converter comprises matching the impedance of the converter and the machine to an impedance of the power source, wherein a power factor angle associated with a current of a first winding of the plurality of windings and a voltage of the first winding of the plurality of windings is substantially zero.

18. The article of manufacture of claim 16, wherein the converter and the machine comprise an inductive reactance, and wherein the inductive reactance limits a current of the plurality of windings.

19. An apparatus for improving machine drive performance comprising:
    a controller configured to control an impedance converter;
    wherein the converter is configured to be electrically coupled to a plurality of first ends of a plurality of windings of a generator;
    wherein substantially no real power flows through the plurality of first ends;
    wherein a plurality of second ends of the plurality of windings of the generator are configured to be electrically coupled to a load that is powered by the generator; and
    wherein a target impedance of the converter is defined by $XINV2=(E/Irated)-Xds$, where $XINV2$ is the target impedance, Irated is the rated current of the machine, E is an internal emf phase voltage of the machine, and Xds is a direct axis reactance of the machine.

20. The apparatus of claim 19, wherein the controller is configured to:

match an impedance of the impedance converter and the generator to an impedance of the load based at least in part on a voltage of the plurality of windings or a power factor of the generator.

21. The apparatus of claim 19, wherein the impedance converter is configured to supply at least a portion of a reactive component of the load.

* * * * *